US007242653B2

United States Patent
Mashimo et al.

(10) Patent No.: US 7,242,653 B2
(45) Date of Patent: Jul. 10, 2007

(54) OPTICAL DISC APPARATUS CAPABLE OF DETECTING RECORDING CHARACTERISTICS BASED ON A PREDETERMINED SIGNAL PRERECORDED AND REPRODUCED

(75) Inventors: Akira Mashimo, Tokorozawa (JP); Toshihiro Ogawa, Iruma (JP)

(73) Assignee: Teac Corporation, Tokyo (JP)

( * ) Notice: Subject to any disclaimer, the term of this patent is extended or adjusted under 35 U.S.C. 154(b) by 496 days.

(21) Appl. No.: 09/953,596

(22) Filed: Sep. 12, 2001

(65) Prior Publication Data

US 2002/0031060 A1 Mar. 14, 2002

(30) Foreign Application Priority Data

Sep. 13, 2000 (JP) ............................. 2000-278406
Jul. 16, 2001 (JP) ............................. 2001-215213

(51) Int. Cl.
G11B 7/00 (2006.01)
(52) U.S. Cl. .................................. 369/47.52; 369/47.53
(58) Field of Classification Search ................ 369/116, 369/47.51, 53.22, 53.23, 53.26, 53.27, 53.31, 369/53.35, 53.41, 53.44, 44.29
See application file for complete search history.

(56) References Cited

U.S. PATENT DOCUMENTS 5,177,729 A * 1/1993 Muramatsu et al. ..... 369/59.13
5,293,366 A * 3/1994 Ohta ....................... 369/44.31
5,410,527 A * 4/1995 Ashinuma ................ 369/53.31
5,600,616 A * 2/1997 Inokuchi et al. ......... 369/47.24
5,706,271 A * 1/1998 Hashimoto ............... 369/53.37
5,726,954 A * 3/1998 Matsumoto et al. ........ 369/116
6,487,149 B1 * 11/2002 Yokoi et al. ............. 369/47.51
6,526,007 B1 * 2/2003 Fujita ...................... 369/53.19
6,781,937 B2 * 8/2004 Nakajo .................... 369/59.12

FOREIGN PATENT DOCUMENTS

| JP | 7085494 | 3/1995 |
| JP | 10-064064 | 6/1998 |
| JP | 285485 | 10/2000 |
| JP | 2002-222737 | 11/2000 |
| WO | WO/67251 | 9/2000 |

* cited by examiner

Primary Examiner—Andrea Wellington
Assistant Examiner—Peter Vincent Agustin
(74) Attorney, Agent, or Firm—Ladas & Parry LLP

(57) ABSTRACT

An optical disk drive apparatus for recording a predetermined signal on an optical disk by varying predetermined recording conditions and detecting recording characteristics based on a reproduction signal of the predetermined signal is provided. The optical disk drive apparatus includes a reproducing part for reproducing the predetermined signal for a plurality of times; and recording characteristics detecting part for detecting the recording characteristics based on a plurality of reproduction signals supplied from the reproducing part.

18 Claims, 20 Drawing Sheets

FIG.6

| DISK ID | RECORDING SPEED | TARGET $\beta$ |
|---|---|---|
| D1 | X1 | $\beta 0$ |
| | X2 | $\beta 1$ |
| | X4 | $\beta 2$ |
| | X6 | $\beta 3$ |
| | X8 | $\beta 4$ |
| | X12 | $\beta 5$ |
| | X16 | $\beta 6$ |
| D2 | X1 | $\beta 7$ |
| | X2 | $\beta 8$ |
| | X4 | $\beta 9$ |
| | X6 | $\beta 10$ |
| | X8 | $\beta 11$ |
| | X12 | $\beta 12$ |
| | X16 | $\beta 13$ |
| ⋮ | ⋮ | ⋮ |
| ⋮ | ⋮ | ⋮ |

FIG.7

| RECORDING SPEED | STARTING POWER | POWER STEP |
|---|---|---|
| X1 | Pstt1 | Pstp1 |
| X2 | Pstt2 | Pstp2 |
| X4 | Pstt4 | Pstp4 |
| X6 | Pstt6 | Pstp6 |
| X8 | Pstt8 | Pstp8 |
| X12 | Pstt12 | Pstp12 |
| X16 | Pstt16 | Pstp16 |

FIG.14

| RECORDING SPEED | AMOUNT OF OFFSET | AMOUNT OF STEP |
|---|---|---|
| X1 | Ostt1 | Ostp1 |
| X2 | Ostt2 | Ostp2 |
| X4 | Ostt4 | Ostp4 |
| X6 | Ostt6 | Ostp6 |
| X8 | Ostt8 | Ostp8 |
| X12 | Ostt12 | Ostp12 |
| X16 | Ostt16 | Ostp16 | ium (Te) or Bismuth (Bi) on a signal-recording surface
OPTICAL DISC APPARATUS CAPABLE OF DETECTING RECORDING CHARACTERISTICS BASED ON A PREDETERMINED SIGNAL PRERECORDED AND REPRODUCED

BACKGROUND OF THE INVENTION

1. Field of the Invention

The present invention relates to an optical disk drive apparatus, and particularly relates to an optical disk drive apparatus capable of performing calibration.

2. Description of the Related Art

Optical disk devices of a recordable-type device may be categorized into a Write-Once type and an Erasable type. There are several recording methods for the Write-Once type optical disk. One method is to dispose a material such as Tellurium (Te) or Bismuth (Bi) on a signal-recording surface of the optical disk and then irradiate a laser beam on the recording surface so as to melt the material and form pits thereon. Another method is to utilize a thin-layer of $Sb_2Se_3$, $TeO_x$ or an organic dye as a material of a recording surface and then irradiate a laser beam on the recording surface to vary the light reflectivity.

CD-R disk is one of the Write-Once type optical disks which is provided with pregrooves for guiding purpose. The pregrooves are provided in a slightly wobbled manner in a radial direction with a central frequency of 22.05 kHz. The pregrooves are provided with address information called ATIP (Absolute Time In Pregroove) recorded thereon in a multiplexed manner by FSK modulation with a maximum deviation of +/−1 kHz.

FIG. 1 is a diagram showing a signal-recording format of a CD-R disk. As shown in the figure, the signal recording format of the CD-R disk includes a power calibration area (PCA) provided at a location closer to the center of the disk for recording and measuring an optimum recording power and an information area provided at an outer location. The information area includes a program memory area (PMA) for temporarily storing signal-recording information or skipping information during a Write-Once operation, a read-in area, a user data area and a read-out area.

In case of the CD-R disk which is a write-once type optical disk, an OPC (Optimum Power Control) operation is carried out prior to actual recording of the information, in order to determine an optimum recording power of the laser beam. The OPC operation is an operation for measuring recording characteristics and is carried out on the power calibration area provided at a predetermined position of the disk.

The power calibration area includes a test area for 100 tests (partitions: P100-P001). Each partition includes 15 frames (F01-F15). Test signals are recorded into each one of the 15 frames at 15 different levels of recording power and the test signals recorded in the frames are reproduced individually. A peak value and a bottom value of the test signal are detected for each frame. The optimum recording power is determined based on the peak values and the bottom values. Among the 15 steps of recording power, a recording power that exceeds a predetermined value is selected as the most suitable recording power, i.e., an optimum recording power, for carrying out the following recording operation. Note that it is necessary to select the optimum recording power in such a manner since recording characteristics of the disks differ between different disk manufacturers. If the optimum recording power of the disk is not obtained, the reproduced signals may be reproduced with an increased jitter and at a higher error rate.

FIG. 2 is a graph illustrating a waveform of an AC-coupled RF (high-frequency) signal obtained by reproducing signals recorded on a CD-R disk for showing a peak value (P) and a bottom value (B) of an envelope of the AC-couple RF signal. The AC-coupled RF signal is obtained by removing DC components from the reproduced signals, and thus only contains alternating current (AC) components.

In the prior art, one level of recording power is assigned to each frame and a recording operation is carried out on the test area at 15 steps of power between the minimum level of power and the maximum level of power. Then, as shown in FIG. 2, the peak value (P) and the bottom value (B) of the envelope of the AC-coupled RF (high-frequency) signal reproduced from the test area are detected. A characteristic value for each level of the recording power may be expressed as:

characteristic value $\beta=(P+B)/(P-B)$.

If the bottom value (B) takes a negative value and has the same magnitude as the peak value (P), it holds that: P+B=0, resulting in that $\beta$=0. When the characteristic value $\beta$=0, it may be regarded that the peak value (P) and the bottom value (B) are symmetrical about the horizontal axis. Then, a recording power level for a state where the characteristic value $\beta$ exceeds a predetermined value (for example, 0.04) is taken as an optimum recording power. Subsequent signal recording is carried out based on the thus-obtained optimum recording power.

In the prior art, since the rotational speed of the optical disk is relatively low, even if recording and reproducing on the test area of the optical disk is carried out at the same speed, the recording characteristic can be measured without reducing an accuracy of measurement. However, recently, due to an increased rotational speed of the optical disk, it is difficult to obtain sufficient number of samples of the signals reproduced from the test area of the optical disk. Accordingly, it has been proposed to reduce the rotational speed of the optical disk during reproduction, so as to maintain the accuracy of measurement of the recording characteristic.

However, in a method which maintains the accuracy of measuring the recording characteristic by reducing the rotational speed of the optical disk, the rotational speed of the optical disk must be reduced from a higher speed to a lower speed. Therefore, there is a problem that a greater load is applied to the optical disk drive apparatus and thus the life of the optical disk drive apparatus becomes shorter.

Also, as has been described above, when it is necessary to perform an operation of reducing the rotational speed from a higher speed to a lower speed, there is a problem that an OPC operation becomes time-consuming.

SUMMARY OF THE INVENTION

Accordingly, it is a general object of the present invention to provide an optical disk drive apparatus which can obviate the problems described above.

It is another and more specific object of the present invention to provide an optical disk drive apparatus which can measure recording characteristics at a high accuracy even with a high rotational speed and can reduce the time taken for measuring the recording characteristics, while reducing unwanted load applied on the optical disk drive apparatus.

In order to achieve the above object, an optical disk drive apparatus for recording a predetermined signal on an optical disk by varying predetermined recording conditions and detecting recording characteristics based on a reproduction signal of said predetermined signal is provided, which apparatus including:

a reproducing part reproducing said predetermined signal for a plurality of times; and a recording characteristics detecting part detecting the recording characteristics based on a plurality of reproduction signals supplied from said reproducing part.

With the optical disk drive apparatus described above, an optimum recording condition can be can be detected at a high accuracy. Also, with the optical disk drive apparatus described above, time required for detecting the recording characteristics and unwanted load can be reduced.

BRIEF DESCRIPTION OF THE DRAWINGS

FIG. 6 is a table showing a relationship between ID number, recording speed and target value β of the first embodiment of the present invention;

FIG. 7 is a table showing a relationship between recording speed, starting power and power step of the first embodiment of the present invention;

FIG. 14 is a diagram showing a table indicating a relationship between recording speed, amount of offset and amount of step of the fourth embodiment of the present invention;

DETAILED DESCRIPTION OF THE PREFERRED EMBODIMENTS

In the following, principles and embodiments of the present invention will be described with reference to the accompanying drawings.

Figure 1:
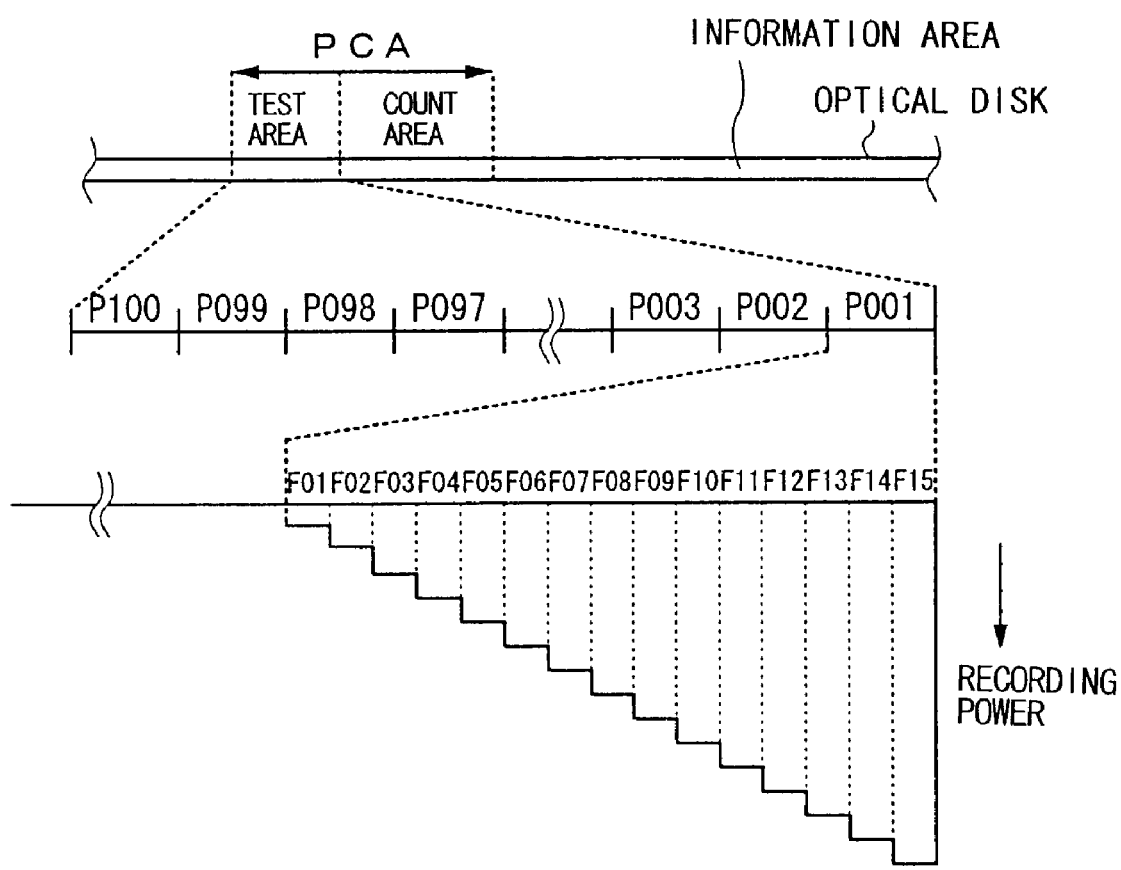
FIG. 1 is a diagram showing a signal-recording format of a CD-R disk.
Figure 2:
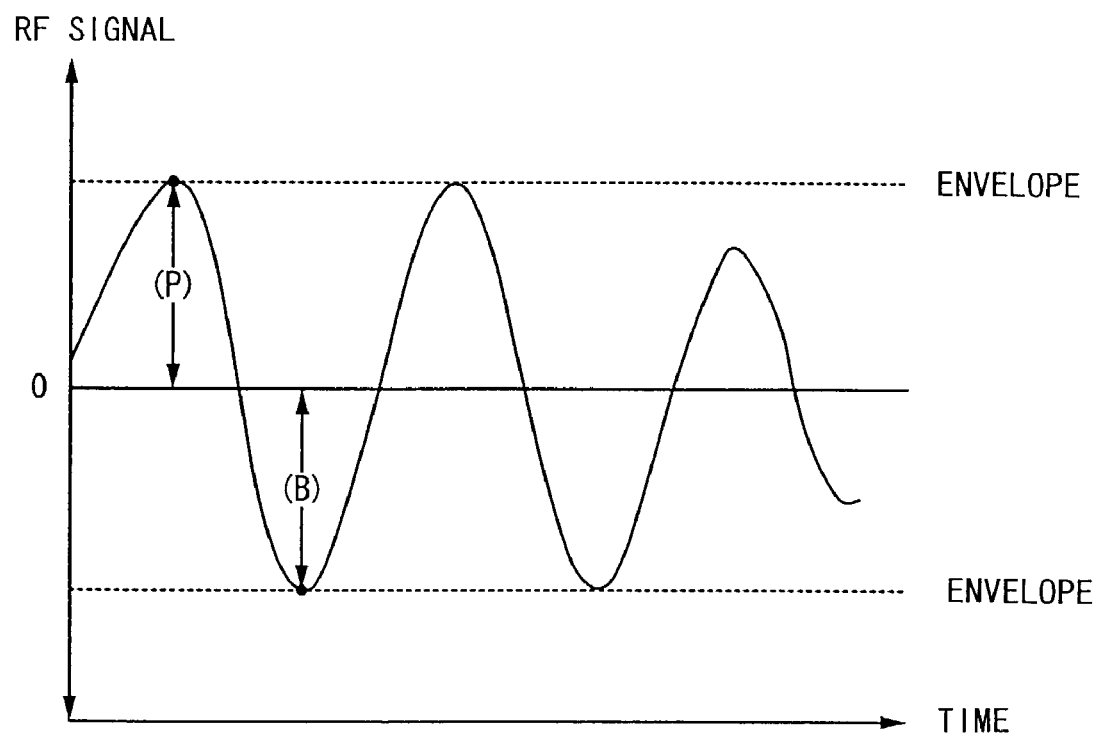
FIG. 2 is a graph illustrating a waveform of an AC-coupled RF (high-frequency) signal obtained by reproducing signals recorded on a CD-R disk for showing a peak value (P) and a bottom value (B) of an envelope of the AC-couple RF signal.
Figure 3:
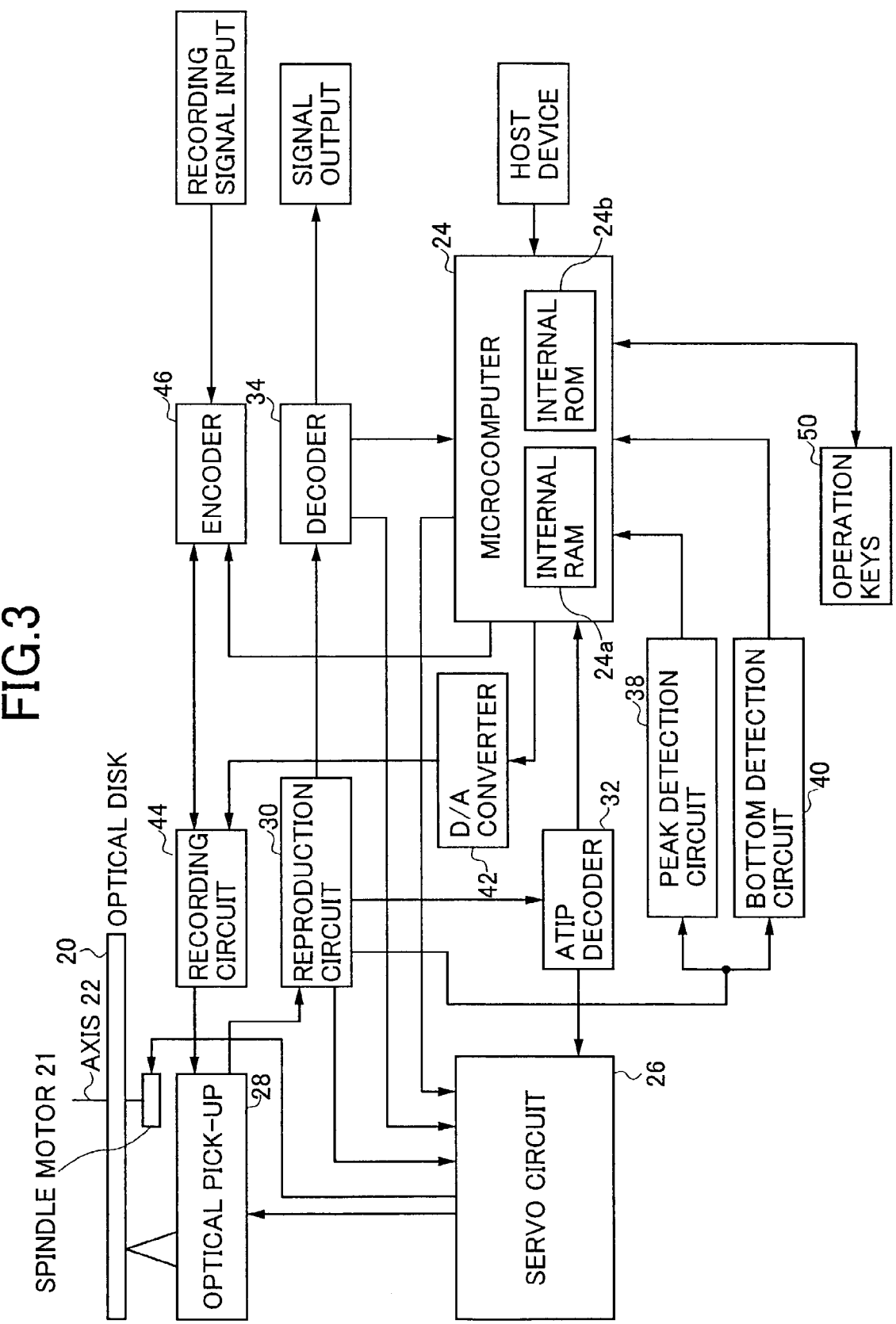
FIG. 3 is a block diagram showing an optical disk drive apparatus of a first embodiment of the present invention.

FIG. 3 is a block diagram showing an optical disk drive apparatus of a first embodiment of the present invention. As shown in the figure, an optical disk (e.g., CD-R disk) 20 is rotatable about an axis 22 by means of a spindle motor 21. A microcomputer 24 issues instructions to a servo circuit 26 based on read/write instructions provided by a host device.

The servo circuit 26 controls the spindle motor 21 and an optical pick-up 28 in accordance with the instructions provided by the microcomputer 24. The servo circuit 26 controls the spindle motor 21 to perform a CLV (constant linear velocity) servo and controls the optical pick-up 28 to move a light beam to a desired frame of the optical disk. Also, the servo circuit 26 performs a focus servo control and a tracking servo control of the optical pick-up 28.

The laser beam emitted from the optical pick-up 28 is reflected on a recording surface of the optical disk 20. The reflected laser beam returns to the optical pick-up 28. The optical pick-up 28 detects a reproduction signal from the reflected light. The reproduction signal obtained by the optical pick-up 28 is supplied to a reproduction circuit 30.

The reproduction circuit 30 shapes the waveform of the reproduction signal from the optical pick-up 28 and demodulates the shaped reproduction signal. The demodulated reproduction signal is supplied to the servo circuit 26 via an ATIP decoder 32 and also to a decoder 34, a peak detection circuit 38 and a bottom detection circuit 40. The ATIP decoder 32 separates an ATIP signal from the reproduction signal. The peak detection circuit 38 detects the peak value P of the reproduced signal and supplies it to the microcomputer 24, and the bottom detection circuit 40 detects the bottom value B of the reproduction signal and supplies it to the microcomputer 24.

As will be described later, the microcomputer 24 derives an optimum recording power by performing an OPC operation, and stores it in an internal RAM 24a. The optimum recording power stored in the internal RAM 24a is supplied to a D/A converter 42 during a recording operation. The D/A converter 42 converts digital data from the microcomputer, which corresponds to the optimum recording power, into an analog signal and supplies the obtained analog signal to a recording circuit 44. An encoder 46 encodes the recording signal during a recording operation and supplies the recording signal to the recording circuit 44.

Based on the signal supplied from the encoder 46 during the recording operation, the recording circuit 44 generates a driving signal for driving a laser diode (LD) in the optical pick-up 28. When generating the driving signal, the recording circuit 44 determines a driving-signal amplifying-ratio in accordance with the analog signal supplied from the D/A converter 42. The driving signal generated in the recording circuit 44 is supplied to the laser diode in the optical pick-up 28. Thus, signal recording is implemented by a laser beam being emitted from the laser diode in the optical pick-up 28 and incident on the optical disk 20.

It is to be noted that a history of the prior OPCs, i.e., the optimum recording powers measured in the past, is stored the internal RAM 24a of the microcomputer 24. The history of the prior OPCs is held in the internal RAM 24a until the tray is extracted for exchanging the optical disk 20.

Further, the internal ROM 24a of the microcomputer 24 is provided with a first table for storing a type (ID number) of the optical disk 20 and a target characteristic value β corresponding to the recording speed (x1, x2, x4, x6, x8, x12 and x16) and a second table for storing a starting power and a step power of the OPC corresponding to the recording speeds (x1, x2, x4, x6, x8, x12 and x16). Also, the microcomputer 24 is supplied with operational inputs from operational keys 50.

Figure 4:
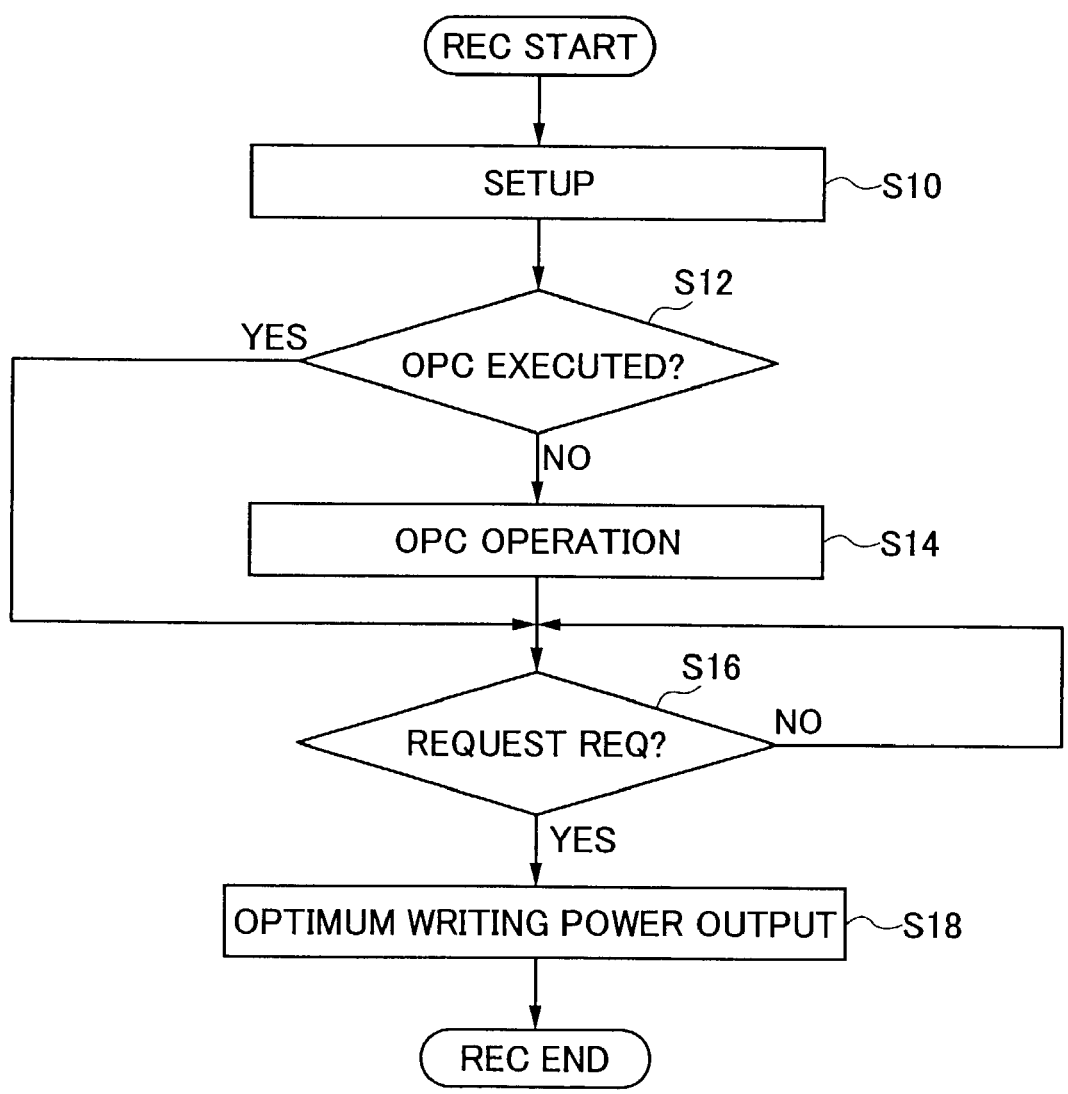
FIG. 4 is a flowchart showing an operation of a microcomputer of the optical disk drive apparatus of the first embodiment of the present invention.

FIG. 4 is a flowchart showing an operation of a microcomputer of the optical disk drive apparatus of the first embodiment of the present invention. In the figure, after starting the recording (REC) operation, the process proceeds to step S10 in which an instruction is supplied to the servo circuit 26 to perform a set-up operation such as controlling the rotation of a thread motor of the optical pick-up so as move it to the desired frame of the optical disk 20. In step S12, it is determined whether or not to implement the OPC operation. If it is determined that the OPC operation has already been carried out, the REC operation continues without implementing the OPC operation.

If it is determined that the OPC operation has not been carried out, the process proceeds to step S14 where the OPC operation is implemented and the optimum recording power is determined. After determination of the optimum recording power by the OPC operation, the process proceeds to step S16 to determine whether or not the recording operation is required. If it is determined that the recording operation is required, the process proceeds to step S18 in which the optimum recording power determined by the OPC operation is read out and then the recording operation is implemented by the optimum recording power determined for the disk. In the following, the OPC output operation will be described.

Figure 5:
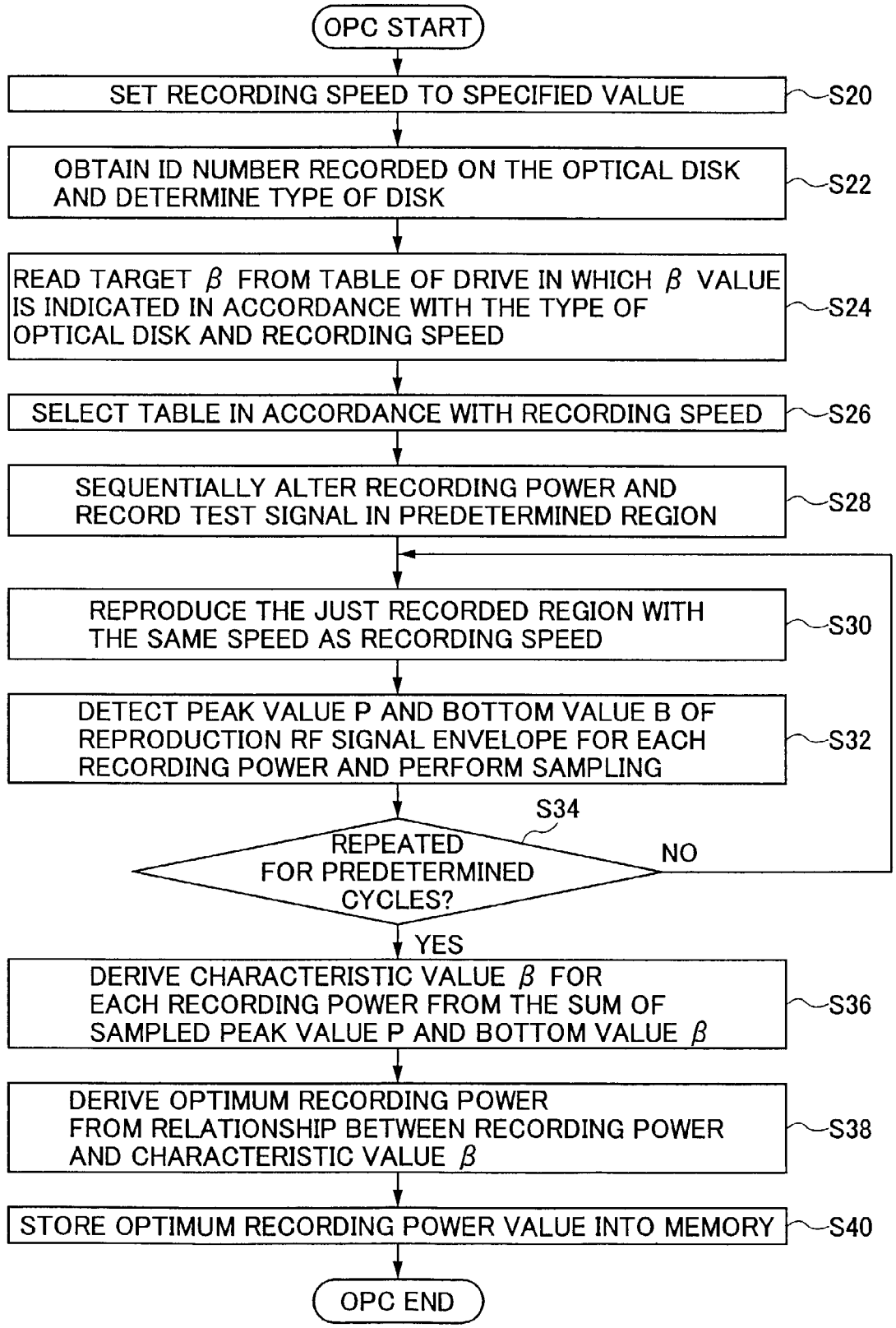
FIG. 5 is a flowchart showing a first embodiment of an OPC operation performed by a microcomputer.

FIG. 5 is a flowchart showing a first embodiment of an OPC operation performed by the microcomputer 24. FIG. 5 shows the OPC operation of step S14 of FIG. 4 in detail. In step S20, the recording speed is set to a value specified through an operation of the operation keys 50. For example, the recording speed is set to a maximum recordable speed. After setting the recording speed, the process proceeds to step S22 in which the ID number recorded on the optical disk 20 is read out and the type of the disk is determined. After determining the type of the disk, the process proceeds to step S24 in which the characteristic value β is read out based on the ID number from the first table stored in the internal ROM 24b shown in FIG. 6 and the recording speed specified using the operation keys 50. For example, when the disk type is "1" and the recording speed is "x8", a characteristic value β4 is read out.

Then, in step S26, a starting power and a step power of the OPC corresponding to the recording speed is read out from the second table stored in the internal ROM 24b shown in FIG. 7. For example, if the recording speed is "x8", the start power of Pstt8 and the power step of Pstp8 are read out.

Then, in step S28, the recording power is varied over 15 steps in accordance with the starting power and the step power set in step S26 and then the test signals are recorded in a predetermined region of the test area for one cycle (15 frames) provided in a power calibration area of the optical disk 20. After recording the test signal in the test area, the process proceeds to step S30 in which each frame of the test area is reproduced at the same speed as the recording speed without reducing rotations of the spindle motor 21.

Then, in step S32, the peak value P and the bottom value B of a reproduction signal, i.e., reproduction RF signal, is detected for each of the 15 steps of the recording power of each frame, and sampling is performed. In step 34, it is determined if a predetermined number of cycles of sampling of the peak value P and the bottom value B have been carried out. If a predetermined number of cycles of sampling have not been completed, steps S30 and S32 are repeated. The predetermined number of cycles of sampling is stored in the internal memory and is counted upon each cycle of sampling.

If a predetermined number of cycles of sampling have been completed, the process proceeds to step S36 where the characteristic value β for each recording power is calculated from the sum of sampling values of the peak values P and the bottom values for a predetermined number of cycles of sampling. Here, the characteristic value β is derived from the sum of sampling values of the peak values P and the bottom values B of the AC-coupled reproduction signal in accordance with the following equation:

$$\beta=(P+B)/(P-B). \tag{1}$$

Then, in step S38, based on the relationship between the characteristic value β and the recording power for each of the 15 steps of recording power (B-to-power function), a recording power corresponding to the characteristic value β4 is derived as the optimum recording power. Then, after calculating the optimum recording power in step S38, the process proceeds step S40 in which the optimum recording power is stored in the internal RAM 24a in, and the process ends.

Thus, according to the OPC operation of the present embodiment, the peak value and the bottom value can be detected with an improved accuracy without varying the rotational speed of the spindle motor 21 for recording and reproducing operations and without reducing the reproducing speed.

It is to be noted that the above-described first embodiment may be implemented by deriving the optimum recording power from a modulation factor m. Such an embodiment utilizing the modulation factor m will be described below as a second embodiment of the present invention.

Figure 8:
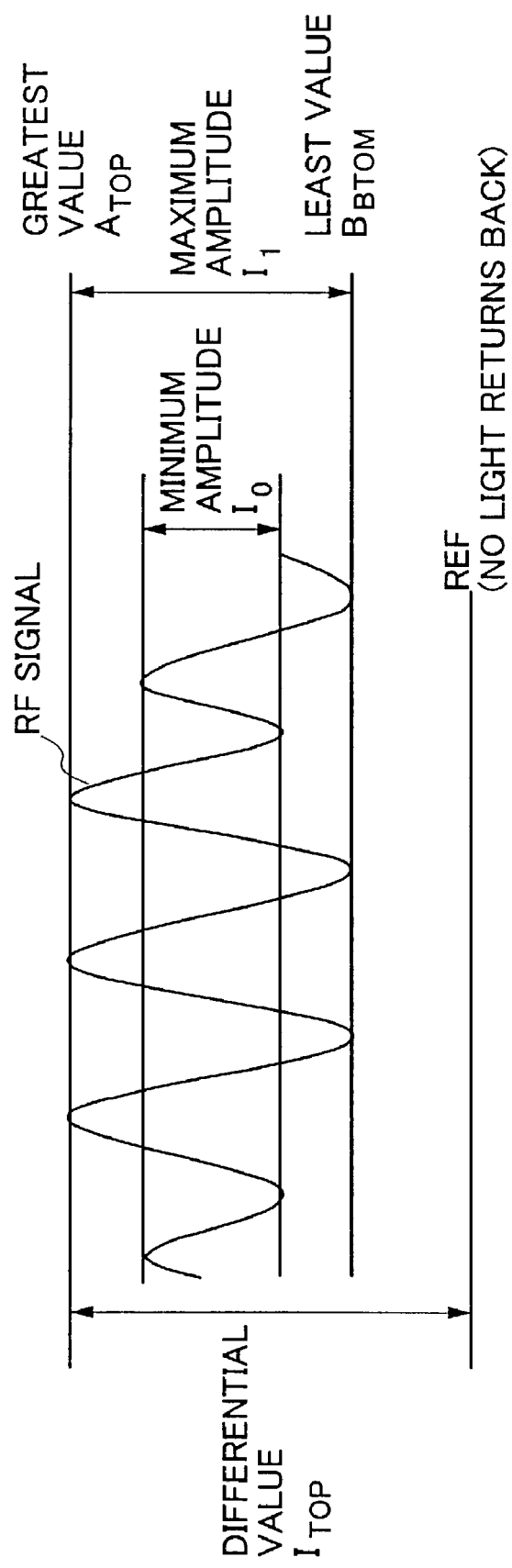
FIG. 8 is a graph illustrating a waveform of a RF (high-frequency) signal for explaining a modulation factor of the RF signal before AC coupling of the second embodiment of the present invention.

FIG. 8 is a graph illustrating a waveform of a RF (high-frequency) signal for explaining a modulation factor of the RF signal before AC coupling of the second embodiment of the present invention. The RF signal before AC coupling is used for detecting the modulation factor. In FIG. 8, the RF signal before AC coupling is a signal equivalent to a reproduction signal including DC components. The RF signal has a minimum amplitude I0 and a maximum amplitude I1. The maximum amplitude I1 has a greatest value $A_{TOP}$ and a least value $B_{BTOM}$. A difference between the greatest value $A_{TOP}$ and a reference level REF is a differential value $I_{top}$, which indicates a mirror reflection level in a state where no pits are formed on the optical disk. The reference level REF shows a no-signal output level in a state where no light reflects back.

According to values related to the RF signals, the modulation factor m is obtained by an equation:

$$M = I1/I_{top} = (A_{top} - B_{btom})/A_{top} \text{-REF}). \tag{2}$$

In the present invention, the modulation factor m is used for deriving the optimum recording power.

Figure 9:
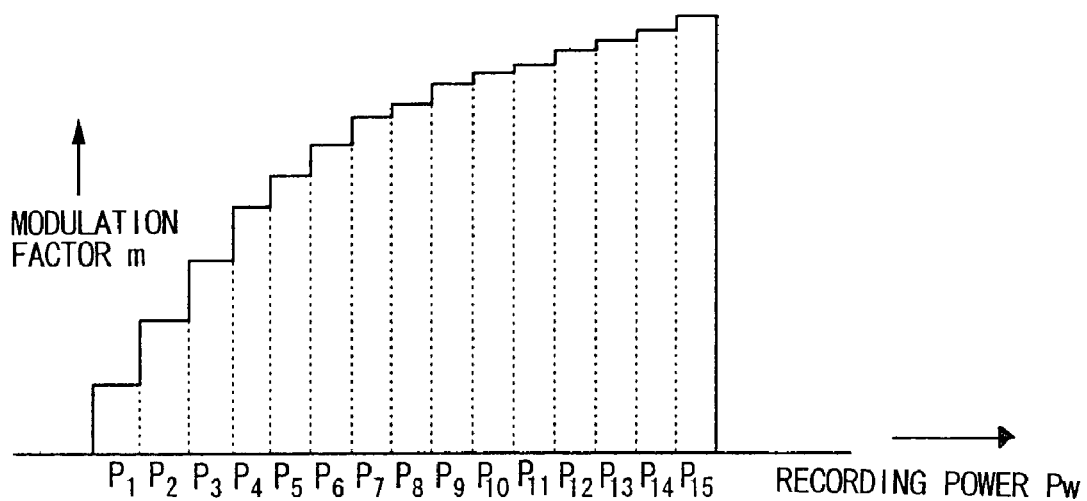
FIG. 9 is a chart showing modulation factor against recording power according to the second embodiment of the present invention.

FIG. 9 is a chart showing modulation factor against recording power according to the second embodiment of the present invention. FIG. 9 shows modulation factor m for recording powers P1 to P15 recorded in 15 frames of the test area of the optical disk. The modulation m varies in response to the recording powers P1 to P15. The modulation factor m decreases as the recording power decreases, due to a decrease in the amplitude of the RF signal. The modulation factor m increases as the recording power increases, due to an increase in the amplitude of the RF signal. When the recording power is increased to a certain value, the modulation factor m saturates. When used for recording the optical disk, the recording power near the saturation point minimizes the occurrence of jitter or error. Thus, the optimum recording power can be obtained from the modulation factor m.

Figure 10:
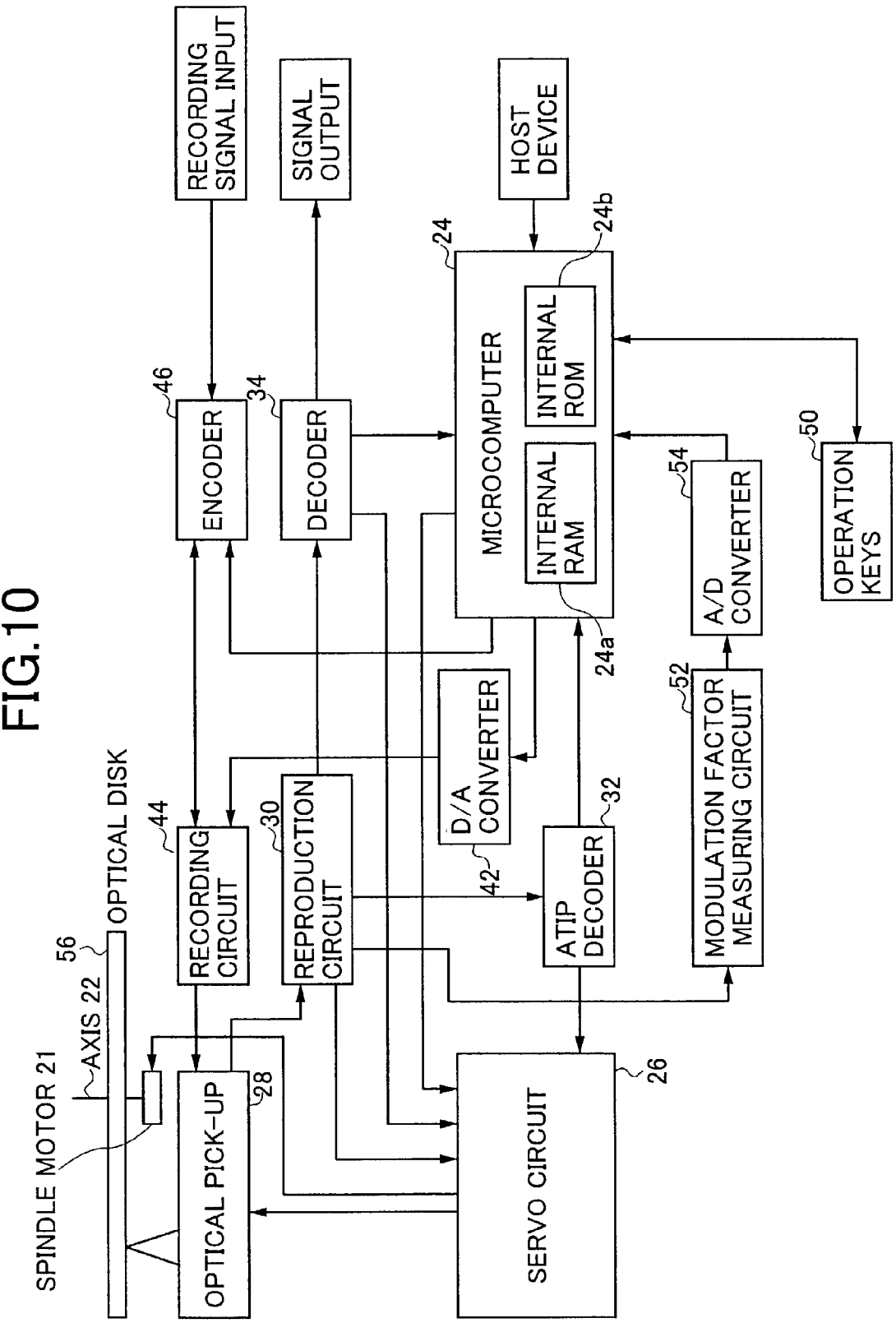
FIG. 10 is a block diagram showing an optical disk drive apparatus of a second embodiment of the present invention.

FIG. 10 is a block diagram showing an optical disk drive apparatus of a second embodiment of the present invention. In the figure, elements similar to those shown in FIG. 3 are indicated with the same reference numerals and will not be described in detail. The optical disk drive shown in FIG. 10 is similar to the optical disk drive shown in FIG. 3 except that a modulation factor measuring circuit 52 and an A/D converter 54 are provided instead of the peak detection circuit 38 and the bottom detection circuit 40.

The modulation factor measuring circuit 52 is supplied with the RF signal before AC-coupling. The modulation factor measuring circuit 52 detects the modulation factor from the RF signal before AC-coupling and supplies it to the A/D converter 54. The A/D converter 54 converts the modulation factor detected in the modulation factor measuring circuit 52 into a digital form and supplies the digitized modulation factor to the microcomputer 24.

The microcomputer 24 derives the optimum recording power based on the modulation factor and stores it in the internal memory. Upon recording, the optimum recording power stored in the internal memory is converted into an analog form in the D/A converter 42 and is supplied to the recording circuit 44.

The internal ROM 24b of the microcomputer 24 is provided with a first table in which, instead of the target characteristic value β, a target modulation factor m is provided which corresponds to the type (ID number) of the optical disk 20 and the recording speed (x1, x2, x4, x6, x8, x12 and x16). Also, the internal ROM 24b is provided with a second table in which a starting power and a step power of the OPC corresponding to the recording speed (x1, x2, x4, x6, x8, x12 and x16) are stored. Also, the operational input from the operation keys 50 is supplied to the microcomputer 24.

As will be described later, the microcomputer 24 refers to the above-described tables to derive the optimum recording power. In the following, the OPC operation for deriving the optimum recording power will be described.

Figure 11:
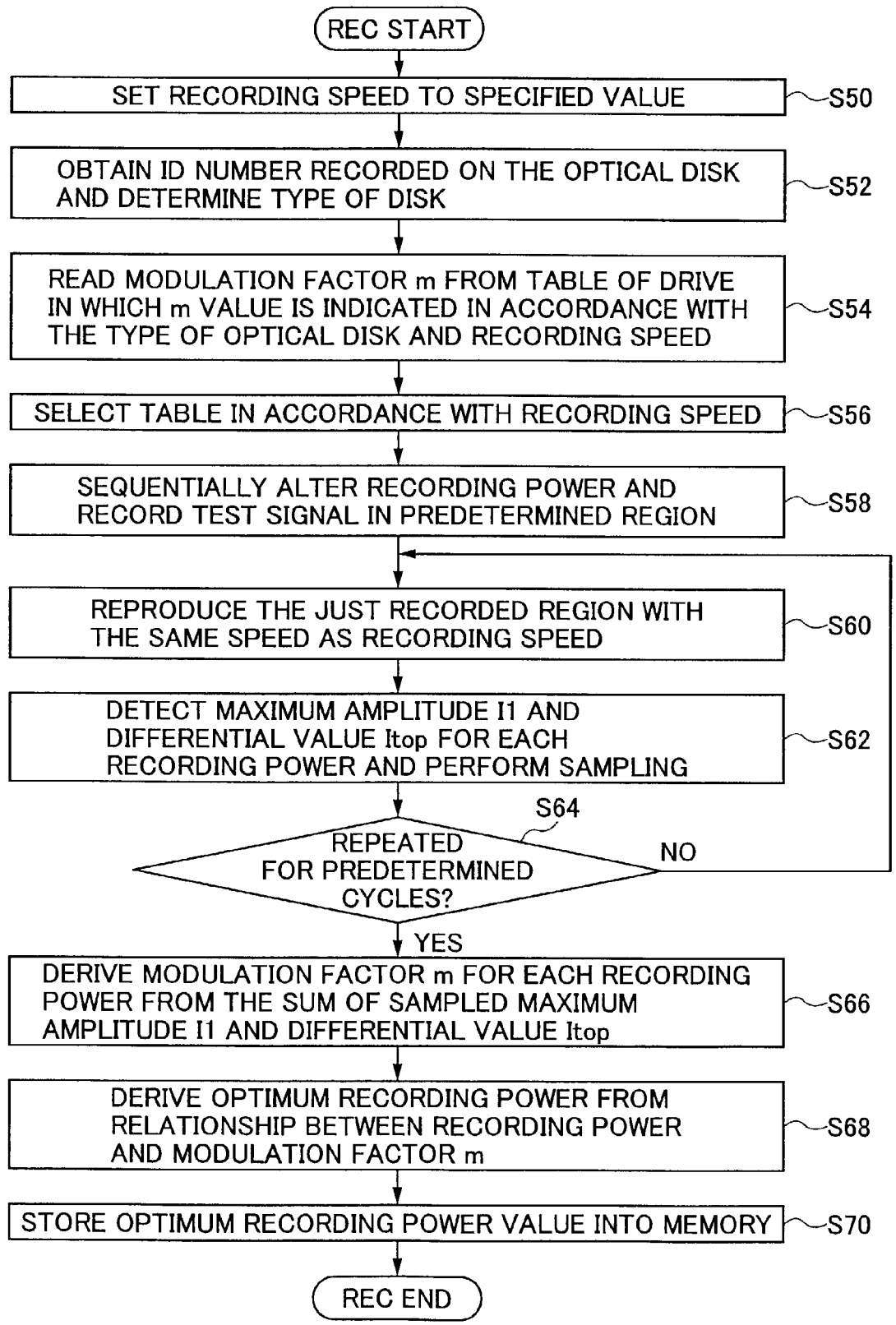
FIG. 11 is a flowchart showing an operation of a microcomputer of the optical disk drive apparatus of the second embodiment of the present invention.

FIG. 11 is a flowchart showing an operation of a microcomputer of the optical disk drive apparatus of the second embodiment of the present invention. In the figure, at step S50, the recording speed is set to a value specified by an operation from the operational keys 50. After setting the recording speed, the process proceeds to step 52 where the ID number recorded in the optical disk 20 is read out to determine the type of the disk. After determination of the type of the disk, the process proceeds to step S54 where the target modulation factor m corresponding to the ID number and the recording speed specified by the operational keys 50 are read out from the first table stored in the internal ROM 24b. In step S56, the starting power and the step power corresponding to the recording speed are read out from the second table stored in the internal ROM 24b.

Then, in step S58, the recording power is varied over 15 steps based on the starting power and the step power readout in step S56 and the test signal is recorded in the predetermined region of a test area for one cycle (15 frames) of the power calibration area of the optical disk 20. After the test signal is recorded in the test area, the process proceeds to step S60 where each frame of the test area is reproduced with the same speed as the recording speed without reducing rotations of the spindle motor 21.

Then, in step S62, the maximum amplitude I1 and the differential value Itop of the reproduction signal for each of the 15 steps of recording power of each frame, i.e., the reproduction RF signal before AC coupling, and then a sampling operation is carried out. In step S64, it is determined whether the sampling of the maximum amplitude I1 and the differential value Itop for a predetermined number of cycles have been carried out. If it is determined that a predetermined number of cycles of sampling have not been carried out, the processes of steps S60 and S62 are repeated. Also, the predetermined number of cycles of sampling is stored in the internal memory.

If it is determined in step S64 that a predetermined number of cycles of sampling have been carried out, the process proceeds to step S66 where the modulation factor m of each recording power is calculated from the sum of sampling values of the maximum amplitude I1 and the differential value Itop for a predetermined number of cycles. Here, the modulation factor m is obtained from equation (2) using the values of the maximum amplitude I1 and the differential value Itop.

Then, in step S68, based on the relationship between the modulation factor m and the recording power for each of the 15 steps (modulation factor m-to-power function), a recording power corresponding to the modulation factor m is derived as the optimum recording power. Then, after calculating the optimum recording power in step S68, the process proceeds to step S70 in which the optimum recording power is stored in the internal RAM 24a, and the process ends. The recording operation is performed based on the optimum recording power recorded in the internal memory.

Thus, according to the present embodiment, when reproducing the data in the test area, a predetermined number of cycles of reproduction is carried out, and the optimum recording power can be derived based on the modulation factor m of the RF signals before AC coupling, without reducing the reproducing speed.

In the above-described second embodiment, the optimum recording power is calculated and set using the modulation factor m which is an index showing the magnitude of amplitude of the RF signal before AC coupling. However, it is to be noted that the optimum recording power can be derived using parameter γ obtained from the modulation factor m and the recording power Pw. A third embodiment of the present invention utilizing the parameter γ will be described.

Figure 12:
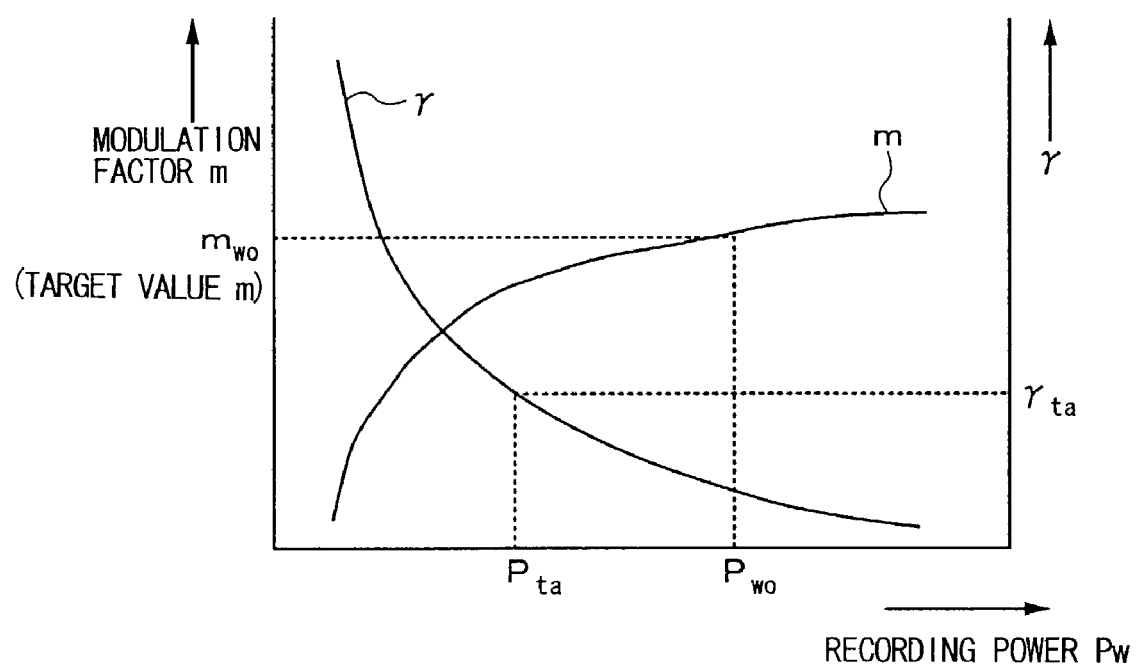
FIG. 12 is a graph showing relationships of modulation factor m and parameter γ against the recording power of a third embodiment of the present invention.

FIG. 12 is a graph showing relationships of modulation factor m and parameter γ against the recording power of a third embodiment of the present invention. In the figure, the parameter γ is derived from the recording power Pw and the modulation factor m by a following equation:

$$\gamma = (dm/dPw) \times (Pw/m). \quad (3)$$

In equation (3), (dm/dPw) represents the derivative (differentiated value) of the modulation factor m differentiated by the recording power Pw.

Also, target value γta and coefficient ρ are recorded in the optical disk 20 as the ATIP information. As shown in FIG. 12, the target recording power Pta is obtained from the characteristic of parameter γ based on the target value γta recorded in the optical disk. The coefficient ρ is used for deriving the optimum recording power Pwo. The optimum recording power Pwo is derived from the target recording power Pta and the coefficient ρ using the following equation:

$$Pwo = \rho \times Pta. \quad (4)$$

Thus, the optimum recording power can be derived using the characteristic of parameter γ obtained from the modulation factor m of the RF signal. Also, the target value γta may a value be stored in a table based on the type of the disk (ID number) and the recording speed, and may be read out from the table.

In the optical disk drive of the present invention, in order to derive the optimum recording power, firstly the 15 steps of recording power are determined by referring to the table, then a recording operation is carried out, and the optimum recording power is derived based on the above-described characteristic value, modulation factor and parameter. However, the present invention is not limited to the above-described embodiments. For example, instead of referring to the table in which the 15 steps of recording power of the OPC operation are stored, the optimum recording power may be calculated by obtaining a recommended recording power of the ATIP information and implementing test recording with 7 steps of recording powers at equal interval above and below the recommended recording power. The recommended recording power corresponds to the normal speed (x1) recording, and when the recording speed is xX, a recording power of approximately $\sqrt{X}$ times the recommended recording power is required.

The general idea of the present invention is to implement reproduction for a plurality of times at the same speed as the recording speed. This allows measuring the optimum recording power with an increased accuracy and reducing time required for measuring the optimum recording power, while reducing unwanted load on the optical disk drive. Therefore, the functionality of the optical disk drive can be improved.

In the embodiments described above, the optimum recording power is detected as the optimum recording condition. However, it is to be noted that an optimum amount of tracking offset may be detected as the optimum recording condition.

Figure 13:
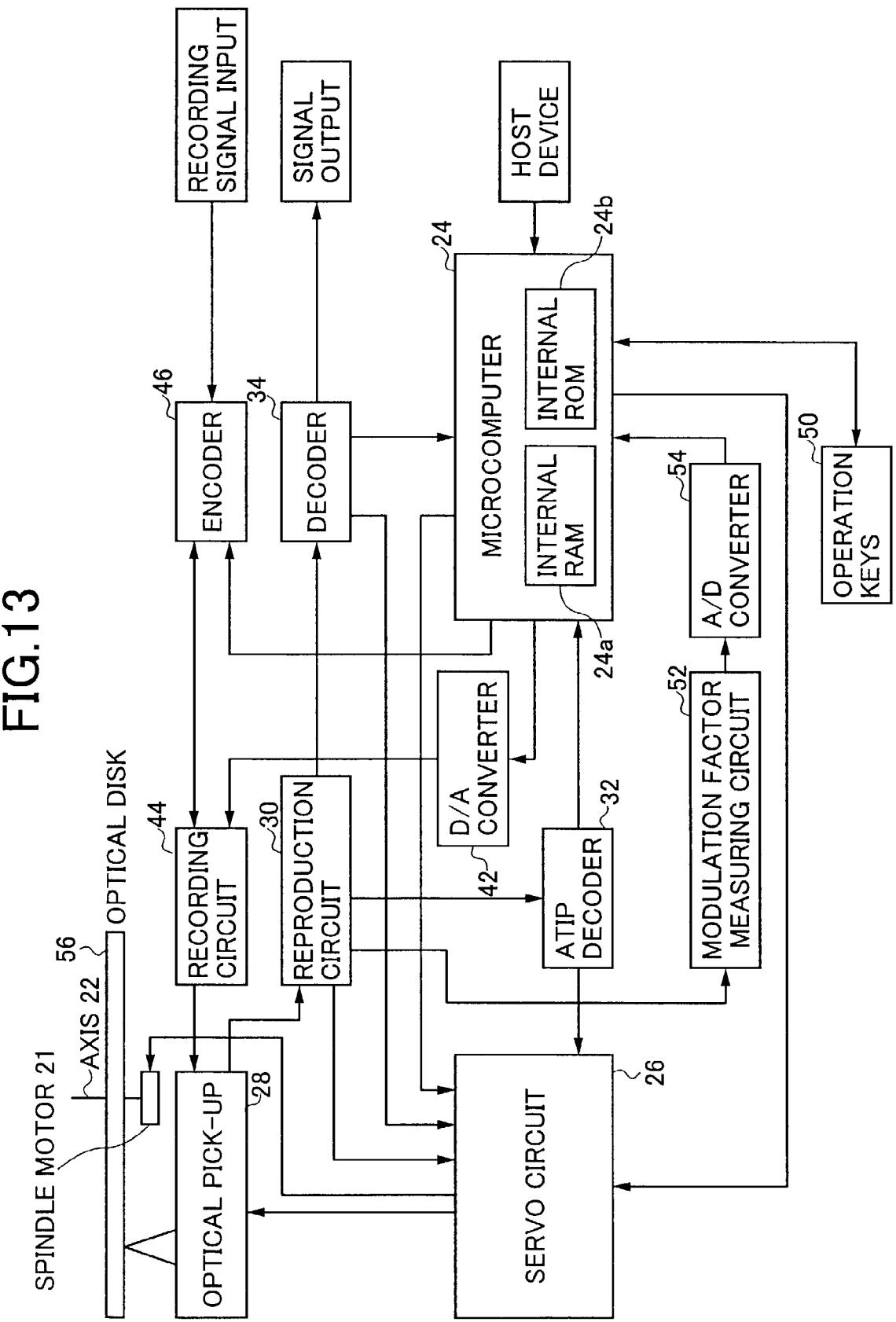
FIG. 13 is a block diagram showing an optical disk drive apparatus of a fourth embodiment of the present invention.

FIG. 13 is a block diagram showing an optical disk drive apparatus of a fourth embodiment of the present invention. In the figure, elements similar to those shown in FIG. 10 are indicated with the same reference numerals and will not be described in detail. The optical disk drive shown in FIG. 13 is similar to the optical disk drive shown in FIG. 10 except that a jitter detection circuit 58 is provided instead of the modulation factor measuring circuit 52. The jitter amount detection circuit 58 includes an equalizer for boosting a specific frequency band of the reproduction RF signal, a digitizing circuit for digitizing the boosted RF signal, a PLL (Phase Locked Loop) circuit for generating a clock signal from the digitized RF signal and a phase comparator for comparing the phase of the clock signal obtained in the PLL circuit and the phase of the reproduction RF signal and detecting the offset between the phases, all of which are not shown in the figure. The jitter signal from the phase comparator is converted to a digital form and supplied to the microcomputer 24 as an amount of jitter.

The microcomputer 24 derives an optimum amount of tracking offset base on the amount of jitter obtained by a plurality of reproduction operations at the same speed as the recording speed. The optimum amount of tracking offset is stored in the internal memory. The optimum amount of tracking offset stored in the internal memory is supplied to the servo circuit 26 during recording operation. The servo circuit 26 performs tracking control by biasing a tracking error signal in accordance to the optimum amount of tracking offset.

FIG. 14 is a diagram showing a tracking offset setting table in which offset amount and step amount are recorded in response to the recording speed (x1, x2, x4, x6, x8, x12 and x16), which may be stored in the internal ROM 24b of the microcomputer 24. Also, the operational input from the operational keys is supplied to the microcomputer 24. As will be described later, the microcomputer 24 derives the optimum amount of tracking offset by referring to the above-described table. An operation of deriving the optimum amount of tracking offset will be described below.

Figure 15:
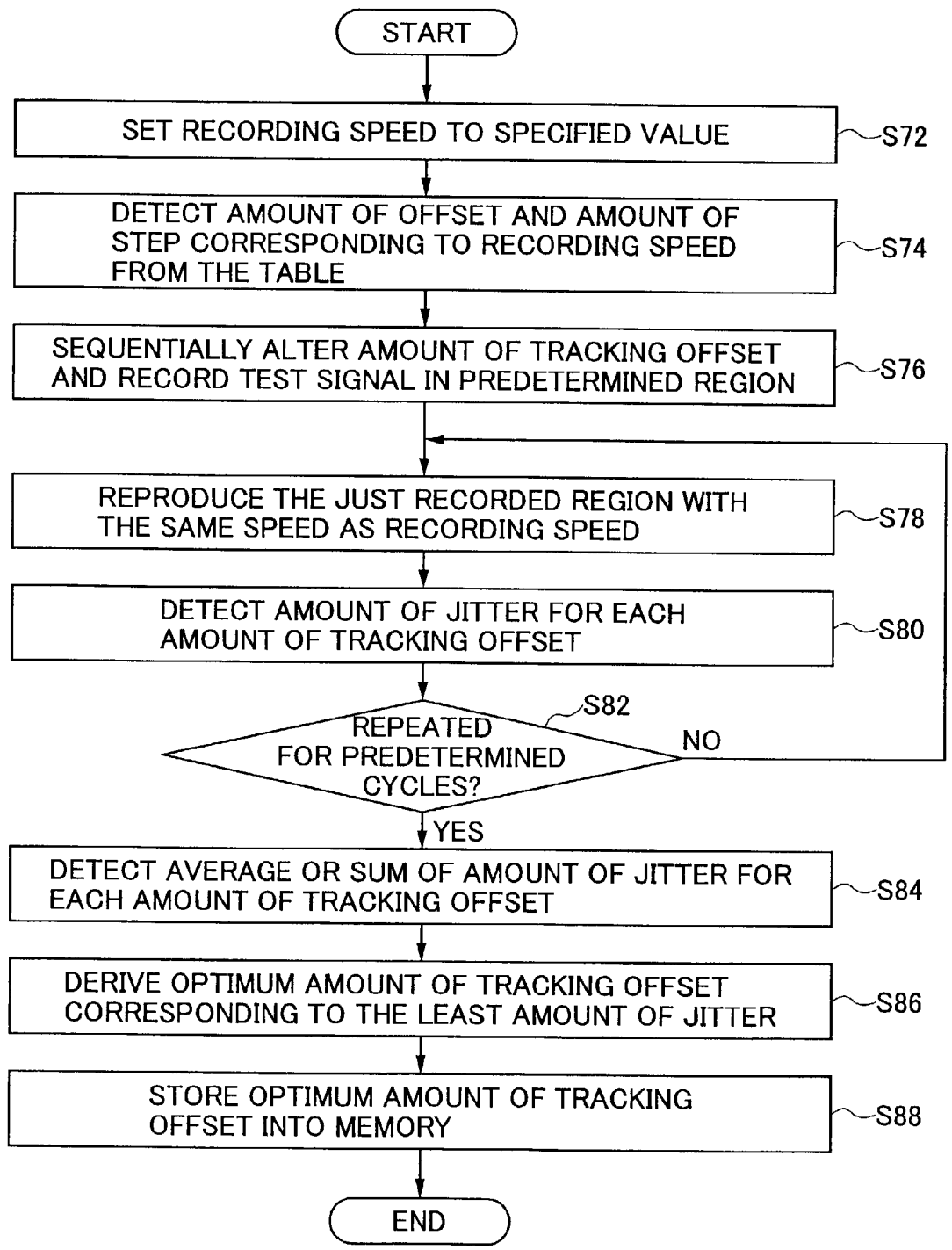
FIG. 15 is a flowchart showing an operation of a microcomputer of the optical disk drive apparatus of the fourth embodiment of the present invention.

FIG. 15 is a flowchart showing an operation of a microcomputer 24 of the optical disk drive apparatus of the fourth embodiment of the present invention. In the figure, in step S72, the recording speed is set to a value specified by an operation from the operational keys 50. After setting the recording speed, the process proceeds to step S74 where the amount of offset and the amount of step corresponding to the recording speed are read out from the tracking offset setting table stored in the internal ROM 24b shown in FIG. 14.

Then, in step S76, the tracking offset amount is sequentially altered according to the amount of offset and the amount of step read out in step S74 and then the test signals are recorded in a predetermined region of a test area for one cycle (15 frames) of a power calibration area of the optical disk 20. After the test signal is recorded in the test area, the process proceeds to step S78 where each frame of the test area is reproduced at the same speed as the recording speed without reducing rotations of the spindle motor 21.

Then in step S80, the amount of jitter for each amount of tracking offset is detected from the reproduction RF signal. In step S82, it is determined if a predetermined number of cycles of detection of the amount of jitter have been carried out. If a predetermined number of cycles of sampling have not been completed, the process of steps S78 and S80 are repeated.

Figure 17:
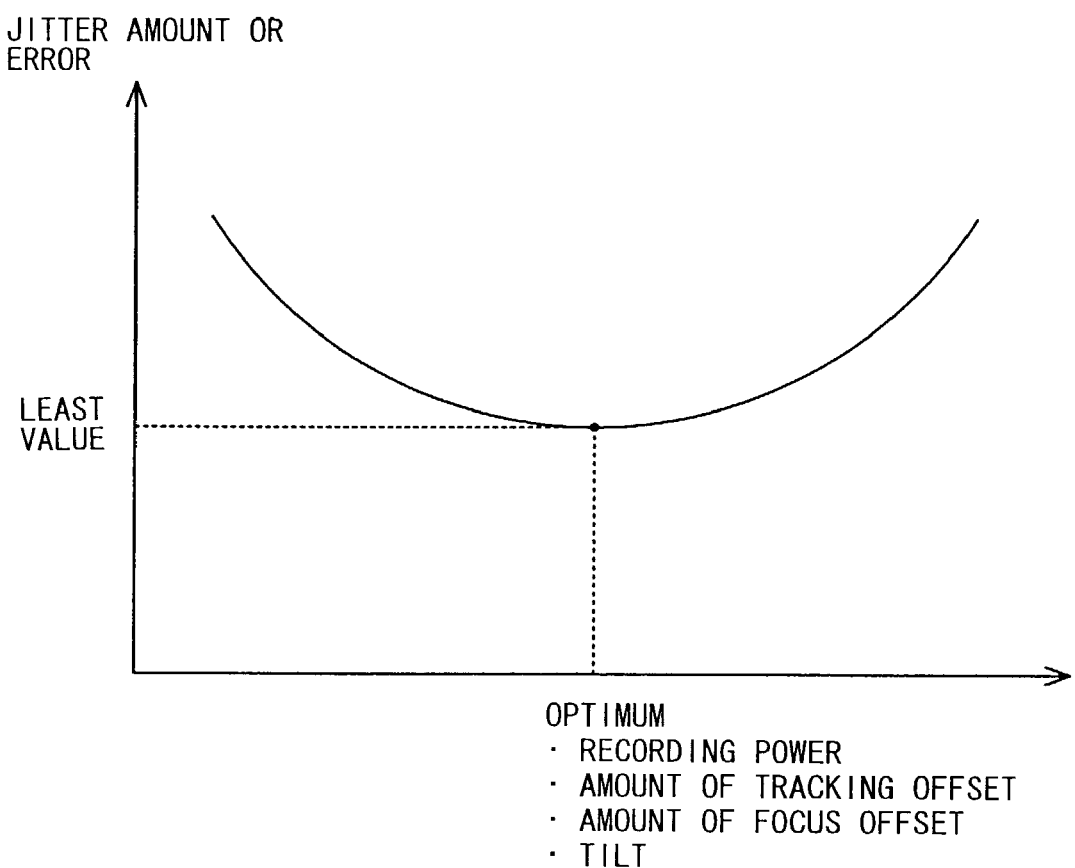
FIG. 17 is a graphs showing a characteristic curve of an amount of jitter or the error rate against recording power, an amount of tracking offset, an amount of focus offset and tilt.

If it is determined in step S82 that a predetermined number of cycles of detection have been carried out, the process proceeds to step S84. In step S84, an average value or a sum of the amount of jitter detected for a predetermined number of cycles for each amount of tracking offset is detected. As a result, a characteristic curve of the amount of jitter against the amount of tracking offset is obtained as shown in FIG. 17.

Then, in step S86, the amount of tracking offset corresponding to the least amount of jitter amount detected in step S84 is determined as the optimum amount of tracking offset. After deriving the optimum amount of tracking offset, the process proceeds to step S88 where the optimum amount of tracking offset is stored in the internal RAM 24a, and the process ends. During a recording operation, a servo control is implemented based on the optimum amount of tracking offset stored in the internal RAM 24a.

Thus, according to the present embodiment, without reducing the reproducing speed, when the data in the test area is reproduced, a predetermined number of cycles of reproduction is implemented, an amount of jitter is detected, and the optimum amount of tracking offset is derived based on the amount of jitter.

In the above-described fourth embodiment, the optimum amount of tracking offset is derived based on the least amount of jitter. However, it is also possible to derive the optimum amount of focus offset based on the jitter amount. An embodiment in which the amount of jitter is detected for each optimum amount of focus offset will be described as a fifth embodiment. Since the constitution of the fifth embodiment is the same as the fourth embodiment, it will not be described in further detail.

Figure 16:
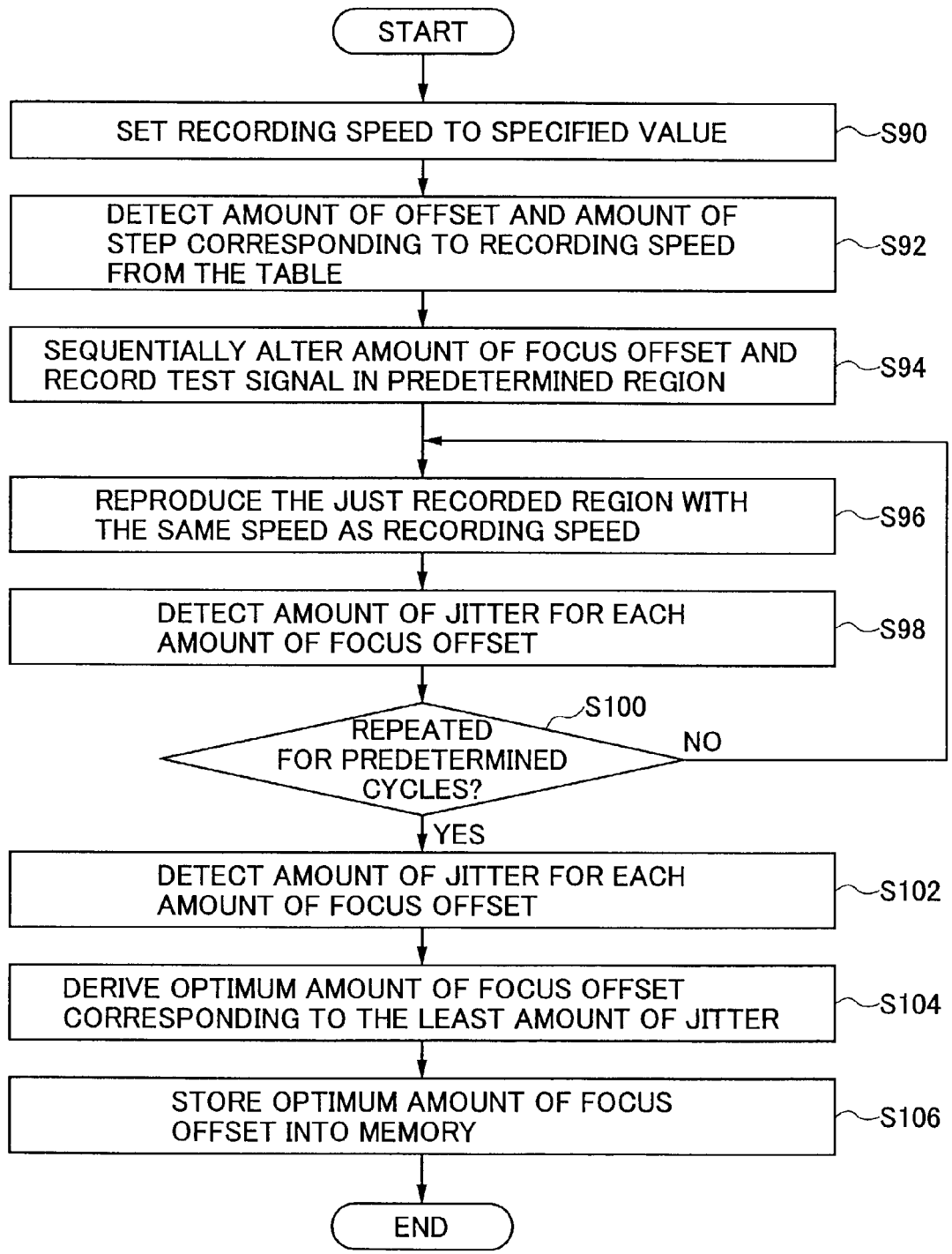
FIG. 16 is a flowchart showing an operation of a microcomputer of the optical disk drive apparatus of the fifth embodiment of the present invention.

FIG. 16 is a flowchart showing an operation of a microcomputer of the optical disk drive apparatus of the fifth embodiment of the present invention. In the figure, in step S90, the recording speed is set to a value specified by an operation of the operation keys 50. After setting the recording speed, the process proceeds to step S92 where the amount of offset and the amount of step corresponding to the recording speed are read out from a focus offset setting table stored in the internal ROM 24b. The focus offset setting table has a data structure similar to the tracking offset setting table shown in FIG. 14 such that the amount of focus offset and its amount of step are recorded for each recording speed.

Then, in step S94, the amount of focus offset is sequentially altered according to the amount of offset and the amount of step read out in step S92 and then the test signals are recorded in a predetermined region of a test area for one cycle (15 frames) of a power calibration area of the optical disk 20. After the test signal is recorded in the test area, the process proceeds to step S96 where each frame of the test area is reproduced at the same speed as the recording speed without reducing rotations of the spindle motor 21.

Then in step S98, the amount of jitter for each amount of focus offset is detected from the reproduction RF signal. In step S100, it is determined if a predetermined number of cycles of detection of the amount of jitter for each amount of focus offset of a predetermined cycles preset in the internal memory have been carried out. If a predetermined number of cycles of detection have not been completed, the process of steps S96 and S98 are repeated.

If it is determined in step S100 that a predetermined number of cycles of detection have been carried out, the process proceeds to step S102. In step S102, an average value or a sum of the amount of jitter detected for a predetermined number of cycles for each amount of focus offset is detected.

Then, in step S104, the amount of focus offset corresponding to the least amount of jitter detected in step S102 is determined as the optimum mount of focus offset. After deriving the optimum amount of focus offset, the process proceeds to step S88 where the optimum amount of focus offset is stored in the internal RAM 24a, and the process ends. During a recording/reproducing operation, a servo control is implemented based on the optimum amount of focus offset.

Thus, according to the present embodiment, without reducing the reproducing speed, when reproducing the data in the test area, a predetermined number of cycles of reproduction is carried out, the amount of jitter is detected, and the optimum amount of focus offset can be derived based on the amount of jitter.

Figure 18:
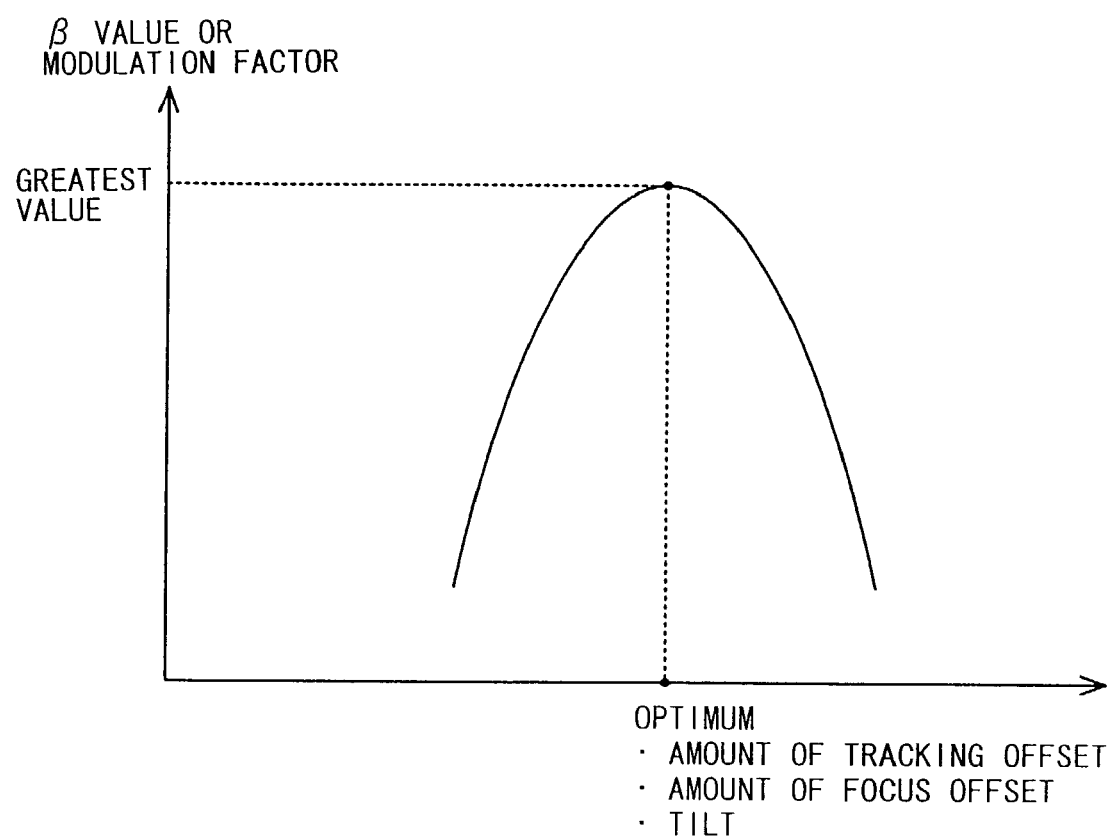
FIG. 18 is a characteristic curve of β value or modulation factor against an amount of tracking offset, an amount of focus offset and tilt.

In the fourth and fifth embodiments described above, the optimum amount of tracking offset and the optimum amount of focus offset are derived based on the amount of jitter. However, it is also possible to derive the optimum amount of tracking offset and the optimum amount of focus offset based on the characteristic value characteristic value β and the demodulation factor m which are obtained from the characteristic curve shown in FIG. 18. It is also possible to derive an optimum recording power and an optimum tilt of the optical pick-up bases on the amount of jitter. Also, the number of error correction may be detected first, and then an error rate may be derived from the detected number of error corrections, so as to derive the optimum amount of tracking offset, the optimum amount of focus offset, the optimum recording power and the optimum tilt.

Also, during a normal recording/reproducing operation, the test tracks may be accessed so as to obtain characteristics such as the amount of jitter and error rate, and to update the optimum amount of tracking offset, the optimum amount of focus offset, the optimum recording power and the optimum tilt. Also, the recording/reproducing operation may be implemented using mutually different frames and detected at the same time.

An embodiment in which the optimum tilt is detected based on the least value of the jitter amount as described with reference to the fourth embodiment will be described as a sixth embodiment.

Figure 19:
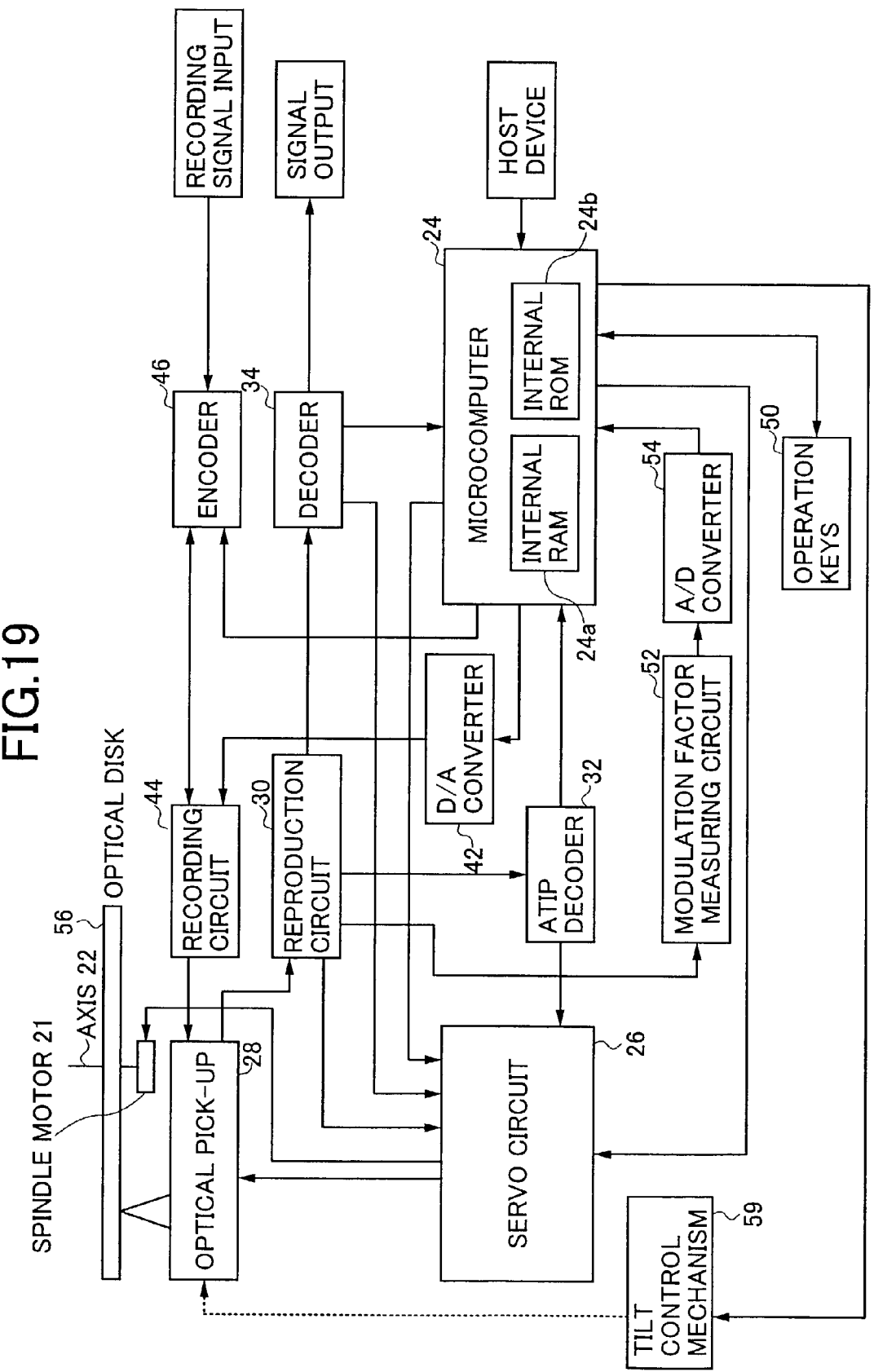
FIG. 19 is a block diagram showing an optical disk drive apparatus of a sixth embodiment of the present invention.

FIG. 19 is a block diagram showing an optical disk drive apparatus of a sixth embodiment of the present invention. In the figure, elements similar to those shown in FIG. 13 are indicated with the same reference numerals and will not be described in detail. The optical disk drive shown in FIG. 19 is similar to the optical disk drive shown in FIG. 13 except that a tilt control mechanism 59 is provided. The tilt control mechanism 59 is a mechanism for controlling an angle of incidence of the light beam on the disk. The microcomputer 24 derives the amount of jitter by varying the tilt by means of the tilt control mechanism 59 and,derives the optimum tilt from the derived amount of jitter. The optimum tilt is stored in the internal memory. The optimum tilt stored in the internal memory is supplied to the tilt control mechanism 59 during recording.

The operational input from the operation keys is supplied to the microcomputer 24. The microcomputer 24 derives the optimum tilt in a manner described later. Now, an operation for deriving the optimum tilt will be described.

Figure 20:
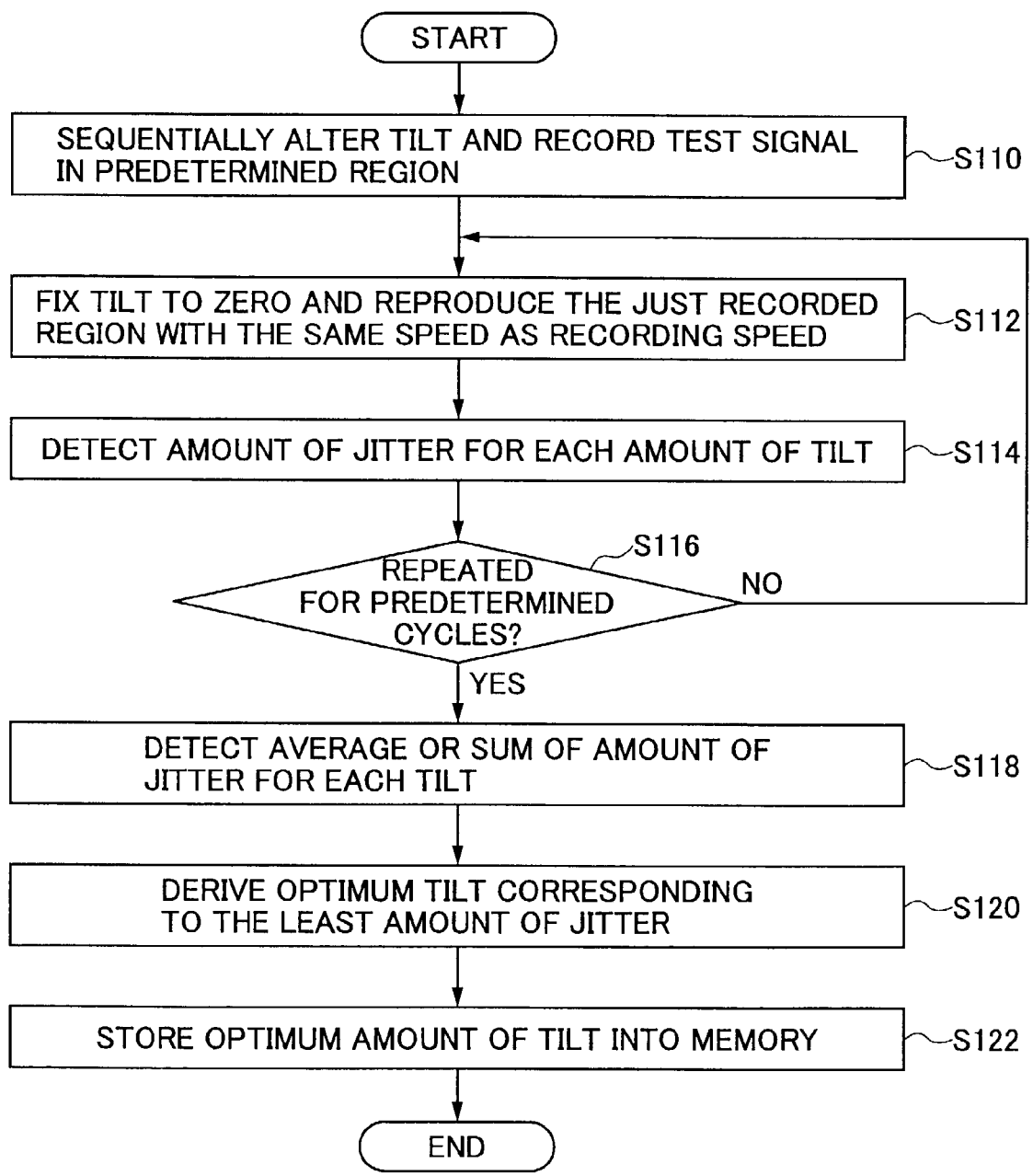
FIG. 20 is a flowchart showing an operation of a microcomputer of the optical disk drive apparatus of the sixth embodiment of the present invention.

FIG. 20 is a flowchart showing an operation of a microcomputer of the optical disk drive apparatus of the sixth embodiment of the present invention. In the figure, in step S110, the tilt is sequentially altered by the tilt control circuit 59 and then the test signals are recorded in a predetermined region of a test area for one cycle (15 frames) of a power calibration area of the optical disk 20. After the test signal is recorded in the test area, the process proceeds to step S112 where the tilt is fixed to a certain amount, e.g., zero, and each frame of the test area is reproduced at the same speed as the recording speed without reducing rotations of the spindle motor 21.

Then in step S114, the amount of jitter for each tilt is detected from the reproduction RF signal. In step S116, it is determined if a predetermined number of detection of amount of jitter preset in the internal memory have been carried out. If a predetermined number of cycles of detection have not been completed, the process of steps S112 and S114 are repeated.

If it is determined in step S116 that a predetermined number of cycles of detection have been carried out, the process proceeds to step S118. In step S118, an average value or a sum of the jitter amounts detected for a predetermined number of cycles for each tilt is detected. As a result, a characteristic curve of the amount of jitter against tilt is obtained as shown in FIG. 17.

Then, in step S120, the amount of tracking offset for the least amount of jitter detected in step S118 is determined as the optimum amount of tracking offset. After deriving the optimum amount of tracking offset, the process proceeds to step S112 where the optimum tilt is stored in the internal RAM 24a, and the process ends. During a recording operation, recording is implemented based on the optimum tracking tilt stored in the internal RAM 24a.

Thus, according to the present embodiment, without reducing the reproducing speed, when the data in the test area is reproduced, a predetermined number of cycles of reproduction is implemented, the amount of jitter is detected, and the optimum tilt is derived based on the amount of jitter. Also, in the above-described sixth embodiment, the optimum tilt may be derived from the characteristic value $\beta$ and the modulation factor m, and the error rate. Also, the control of the tilt is not limited to the optical pick-up, but the angle of the disk may be varied by controlling the tilt of the spindle motor to derive the optimum tilt.

It is to be noted that the recording conditions are not limited to the recording power, the amount of tracking offset, the amount of focus offset and tilt as in the above-described embodiments.

Also, the reproducing part and the reproducing procedures correspond to steps S30-S34, S60-S64, S78-S82, S96-S100 and S112-S116, the recording characteristics detecting part and the recording characteristics detecting procedures correspond to steps S36, S66, S84, S102 and S118 and the optimum condition detecting part and the optimum condition detecting procedures correspond to steps S38, S68, S86, S104 and S120.

Further, the present invention is not limited to these embodiments, and variations and modifications may be made without departing from the scope of the present invention.

The present application is based on Japanese priority application No. 2000-278406 filed on Sep. 13, 2000 and No. 2001-215213 filed on Jul. 16, 2001, the entire contents of which are hereby incorporated by reference.

What is claimed is:

1. An optical disk drive apparatus comprising:
   a storage part configured to store a table in which information sets for varying recording conditions are pre-stored, said information sets corresponding to a plurality of recording speeds;
   a recording part configured to read out one of said information sets from said table corresponding to a selected recording speed of said recording speeds, to alter said recording conditions using said information set read out from said table and to record a predetermined signal in each of a plurality of frames of an optical disk at the selected recording speed under said recording conditions;
   a reproducing part configured to repeatedly reproduce said predetermined signals recorded in the plurality of frames recorded in one recording operation, until the number of reproductions of each of said predetermined signals exceeds a predetermined number; and
   a recording characteristics detecting part configured to detect the recording characteristics for each of said plurality of frames based on a plurality of reproduction signals obtained from the reproducing part.

2. The optical disk drive apparatus as claimed in claim 1, further comprising an optimum condition detecting part configured to detect an optimum condition based on said recording characteristics for each of said plurality of frames detected at said recording characteristics detecting part.

3. The optical disk drive apparatus as claimed in claim 2, wherein said optimum condition detecting part detects a peak value and a bottom value of each of said plurality of reproduction signals, derives a modulation factor based on said peak value and said bottom value, and detects said optimum condition based on said modulation factor.

4. The optical disk drive apparatus as claimed in claim 2, wherein said optimum condition detecting part detects said optimum condition based on an amount jitter or an error rate of said plurality of reproduction signal.

5. The optical disk drive apparatus as claimed in claim 1, wherein said recording condition is recording power.

6. The optical disk drive apparatus as claimed in claim 5, wherein said optimum condition detecting part detects a peak value and a bottom value of each of said plurality of reproduction signals, derives a modulation factor based on said peak value and said bottom value, and detects an optimum recording power based on a derivative of said modulation factor.

7. The optical disk drive apparatus as claimed in claim 5, wherein said recording characteristics is a value obtained by differentiating a modulation factor that is detected based on a peak value and a bottom value of each of said plurality of reproduction signals.

8. The optical disk drive apparatus as claimed in claim 1, wherein said recording condition is an amount of tracking offset.

9. The optical disk drive apparatus as claimed in claim 1, wherein said recording condition is an amount of focus offset.

10. The optical disk drive apparatus as claimed in claim 1, wherein said recording condition is an angle of incidence of a beam against said optical disk.

11. The optical disk drive apparatus as claimed in claim 1, wherein said recording characteristics is a $\beta$ value that is detected based on a peak value and a bottom value of each of said plurality of reproduction signals.

12. The optical disk drive apparatus as claimed in claim 1, wherein said recording characteristics is a modulation factor that is detected based on a peak value and a bottom value of each of said plurality of reproduction signals.

13. The optical disk drive apparatus as claimed in claim 1, wherein said recording characteristics is an amount of jitter or an error rate of said plurality of reproduction signal.

14. The optical disk drive apparatus as claimed in claim 1, wherein said reproducing part reproduces said predetermined signal at the same speed as the selected recording speed.

15. The optical disk drive apparatus as claimed in claim 1,
   wherein said reproducing part configured to repeatedly reproduce said predetermined signals in the plurality of frames at the same speed as said selected recording speed, and said selected recording speed corresponds to a multiple of the lowest recording speed of said plurality of recording speeds.

16. The optical disk drive apparatus as claimed in claim 15, further comprising an optimum condition detecting part detecting an optimum condition based on the detected characteristics detected at said recording characteristics detecting part.

17. The optical disk drive apparatus as claimed in claim 15, wherein said recording condition is recording power.

18. The optical disk drive apparatus as claimed in claim 15, wherein said recording characteristics is a $\beta$ value that is detected based on a peak value and a bottom value of each of said plurality of reproduction signals.

* * * * *